(12) United States Patent
Holmes et al.

(10) Patent No.: US 6,788,459 B2
(45) Date of Patent: Sep. 7, 2004

(54) BINOCULAR METHOD UTILIZING MONOCULAR DEVICES

(75) Inventors: Roy H. Holmes, Salem, VA (US); Mark A. Bryant, Roanoke, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/754,714

(22) Filed: Jan. 12, 2004

(65) Prior Publication Data

US 2004/0141233 A1 Jul. 22, 2004

Related U.S. Application Data

(62) Division of application No. 09/963,459, filed on Sep. 27, 2001, now Pat. No. 6,687,053.

(51) Int. Cl.[7] .............................................. G02B 23/00
(52) U.S. Cl. ...................... 359/411; 359/480; 359/900; 2/6.2
(58) Field of Search .................................. 359/409, 410, 359/411, 480, 481, 815, 816, 900; 351/155, 156; 2/6.2, 6.3, 422, 423, 452

(56) References Cited

U.S. PATENT DOCUMENTS

| | | | |
|---|---|---|---|
| 748,732 A | | 1/1904 | Hogue |
| 1,225,116 A | | 5/1917 | Dunkelsberg |
| 4,449,787 A | | 5/1984 | Burbo et al. |
| 5,307,204 A | | 4/1994 | Dor |
| 5,331,459 A | * | 7/1994 | Dor ............................ 359/409 |
| 5,446,585 A | | 8/1995 | Morley et al. |
| 5,535,053 A | | 7/1996 | Baril et al. |
| 6,462,894 B1 | * | 10/2002 | Moody ........................ 359/815 |

* cited by examiner

Primary Examiner—Mark A. Robinson
(74) Attorney, Agent, or Firm—Edell, Shapiro & Finnan, LLC

(57) ABSTRACT

A mounting assembly for mounting two monocular devices to form a binocular device. A method of collimating the monocular devices, so that the binocular device is collimated.

6 Claims, 4 Drawing Sheets

BINOCULAR METHOD UTILIZING MONOCULAR DEVICES

CROSS-REFERENCE TO RELATED APPLICATION

This application is a divisional of U.S. patent application Ser. No. 09/963,459, filed Sep. 27, 2001, now U.S. Pat. No. 6,687,053.

FIELD OF THE INVENTION

The present invention is directed to optical devices such as those used for night vision.

BACKGROUND OF THE INVENTION

Portable night vision devices are widely used in the military and in law enforcement operations to provide personnel with the ability to view objects at night or during other low light conditions. These devices generally include an objective lens assembly, an image intensifier tube, and an eyepiece, and typically are physically embodied in the form of a monocular device which attaches to a helmet or headband.

By way of background, a monocular device, as the name implies, has a single optical channel giving an intensified view of the low light level scene to one eye. A biocular device presents the same view to both eyes by means of a dual channel eyepiece. A binocular device, on the other hand, has two monocular channels fixed together to present a slightly different view to each eye. Binocular vision provides improved depth perception, and there are some night operational missions, including driving land vehicles or boats, where depth perception helps with the judgment of distances.

The most widely fielded portable night vision devices are in monocular form. It would be desirable to be able to take two monocular devices and quickly assemble a binocular device for those applications where depth perception is necessary. Any such device must have a means for allowing adjustment of the distance between the monoculars, known as the interpupillary distance, to allow for the variation in the distance between the eye pupils of different human beings.

A binocular night vision device needs to have the two intensified images of an object collimated in image space such that the object is presented to each of the user's eyes at the same azimuth and elevation in the binocular field of view. The two pictures are combined in the brain to give binocular vision in the same way as such vision is achieved in normal, unaided daytime binocular vision. This combination of the images is known as binocular fusion. Seeing things with both eyes makes the image appear to be brighter, clearer, and to give additional detail than when it is seen only with one eye. If the object is not seen at the same azimuth and elevation with both eyes there can be difficulties in obtaining binocular fusion which can lead to eyestrain and headaches. Poor binocular fusion negates the above-mentioned advantages of using a binocular night vision device. At the present time, it is believed that there is no method of ensuring that any two monocular devices chosen at random would be collimated.

SUMMARY OF THE INVENTION

It is thus an object of the invention to provide apparatus for forming a binocular device from two monocular devices. It is a further object to provide a method of collimating monocular devices for use in a binocular device.

In accordance with an aspect of the invention, apparatus is provided for forming a binocular device from two monocular devices comprising a structure having a pair of mounting regions which define a distance therebetween corresponding to a desired, nominal binocular spacing between two monocular devices, and a pair of fasteners, each of which is for removably securing a respective monocular device to a mounting region.

In accordance with a further aspect of the invention, a method of collimating monocular devices for use in a binocular device is provided, comprising the steps of:

rotating the eyepieces of the monocular devices by the same predetermined amount in the same direction with respect to a fixed reference point on the monocular device;

providing a mounting means having a right mounting position for a monocular device and a left mounting position opposite the right position;

securing the first monocular device to the mounting means at either the right mounting position or the left mounting position in such rotative orientation that if in the right position an object in the center of field of view of the monocular device is located slightly left in azimuth and centered in elevation, and if in the left position an object in the center of field of view is located slightly right in azimuth and centered in elevation; and securing the second monocular device in the mounting means in the opposite position from the first monocular device in a rotative orientation 180° displaced from the rotative orientation of the first monocular device.

Other aspects of the invention will become apparent by reference to the following description and claims.

BRIEF DESCRIPTION OF DRAWINGS

The invention will be better understood by referring to the accompanying drawings wherein.

DETAILED DESCRIPTION OF PREFERRED EMBODIMENT

Figure 1:
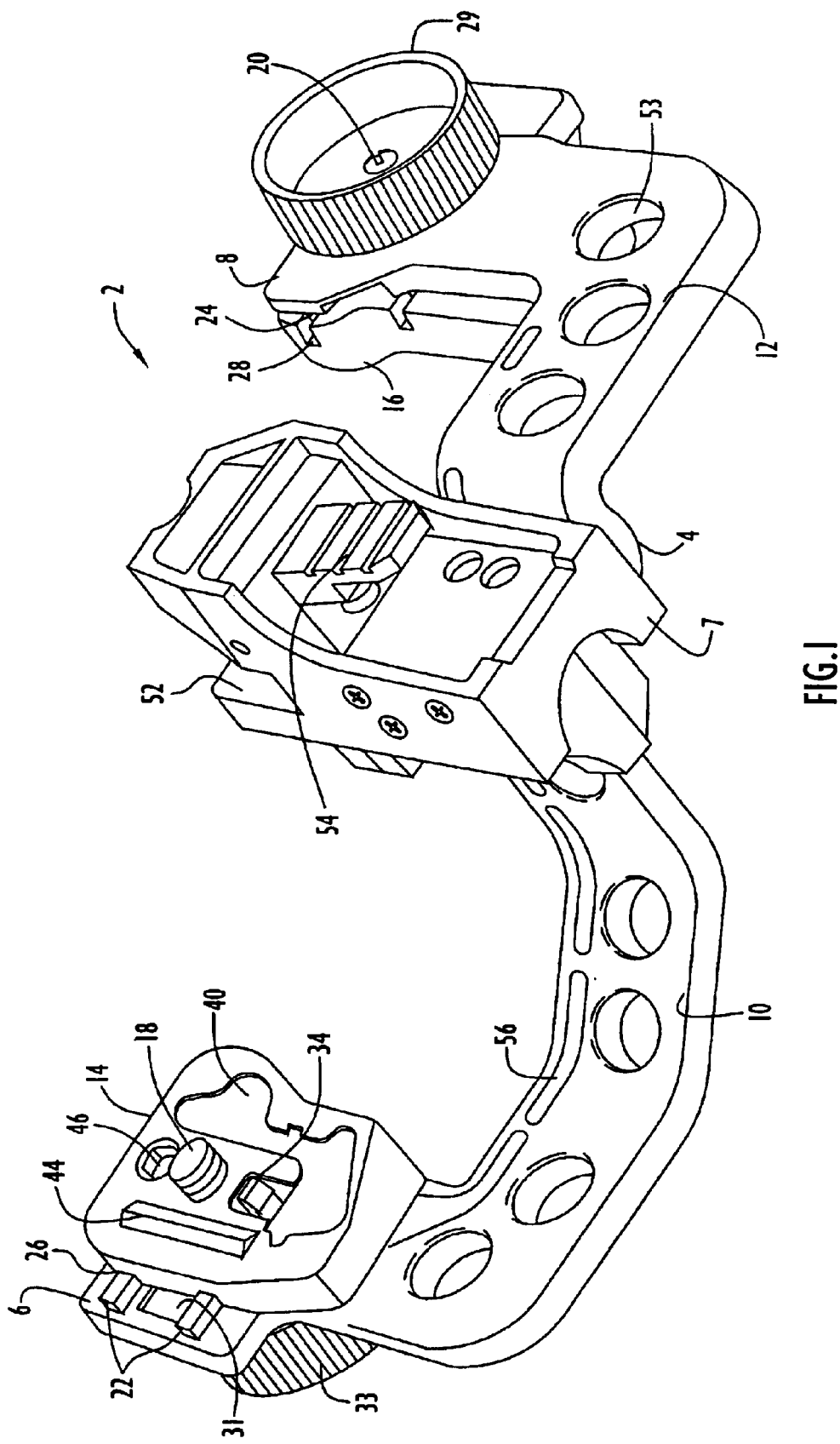
FIG. 1 shows an embodiment of the mounting assembly of the invention.

Referring to FIG. 1, an embodiment of a binocular mounting assembly 2 in accordance with the present invention is shown. Before proceeding further, it is instructive to refer to FIGS. 2 to 4 to see the mounting assembly of FIG. 1 with the monocular devices 30 and 32 mounted therein. Each monocular device is essentially a unity power telescope including an image intensifier tube for amplifying low level light.

Referring again to FIG. 1, a structure 4 is provided having mounting regions 6 and 8. The mounting regions are spaced from each other a distance equal to a desired nominal spacing between the monoculars of a binocular device, and fasteners are secured to the mounting regions for removably mounting monocular devices. A central assembly 7 is provided for attaching the device to a helmet or headband.

The structure 4 in the embodiment of FIG. 1 is comprised of a pair of arms 10 and 12 which connect to the central assembly. The fasteners in the embodiment of FIG. 1 are mounting blocks 14 and 16, and corresponding screws 18 and 20.

Mounting regions 6 and 8 have rails 22 and 24 respectively, built thereon. Mounting blocks 14 and 16 have grooves 26 and 28 which slide on rails 22 and 24 to accomplish lateral movement of the mounting blocks. Referring to mounting region 6 (mounting region 8 is similar), slot 31 is present between the rails. Mounting screw 18 has a first threaded end which passes through the slot and is engaged in a threaded hole in a mounting area on the monocular, such as mounting projections 25 and 27 shown in FIG. 4. Control knob 33 is attached to the second end of screw 18. The screws may be captivated in the slots, for example, by means of E-clips.

Figure 2:
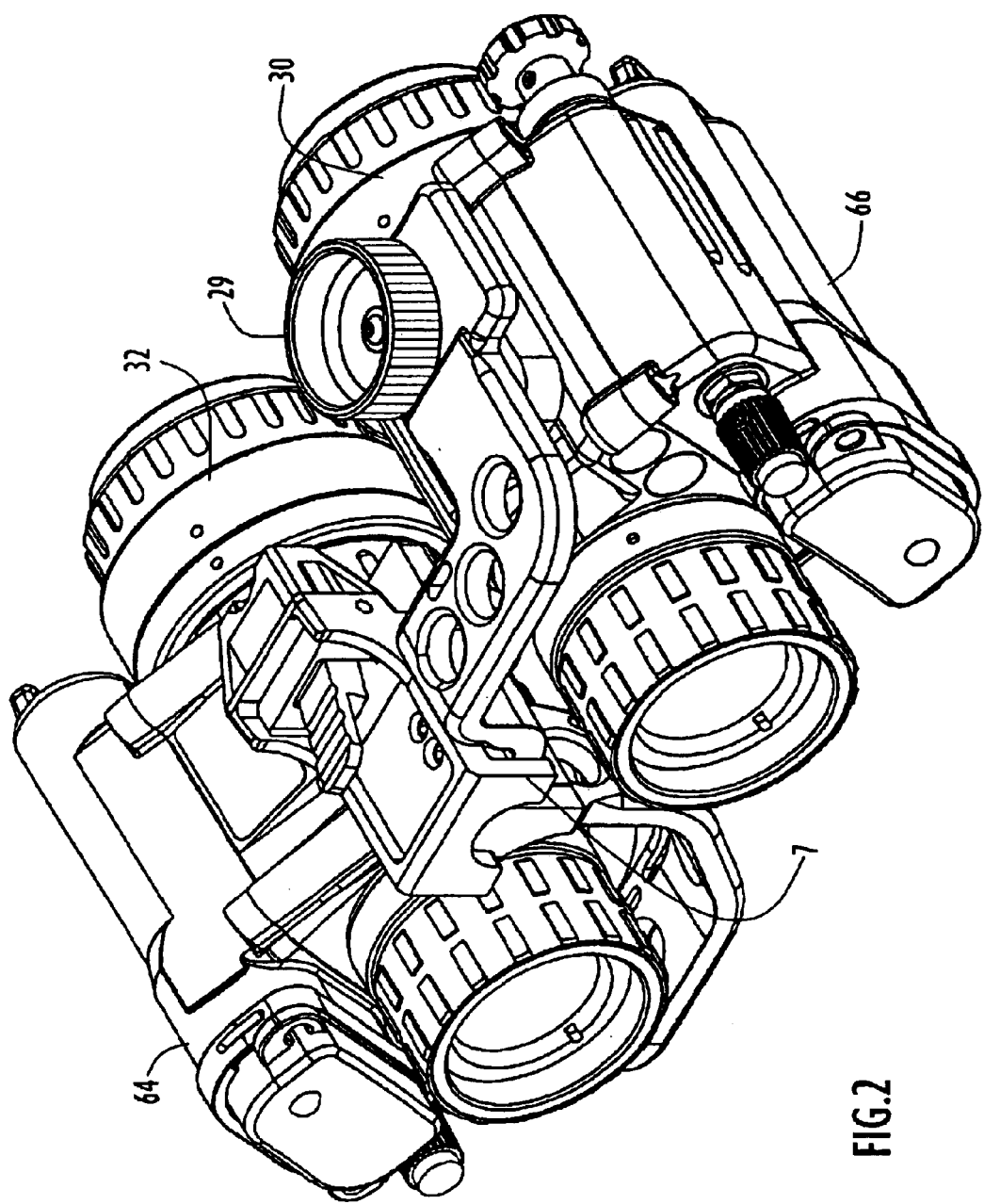
FIG. 2 shows two monocular devices mounted in the embodiment of FIG. 1.
Figure 3:
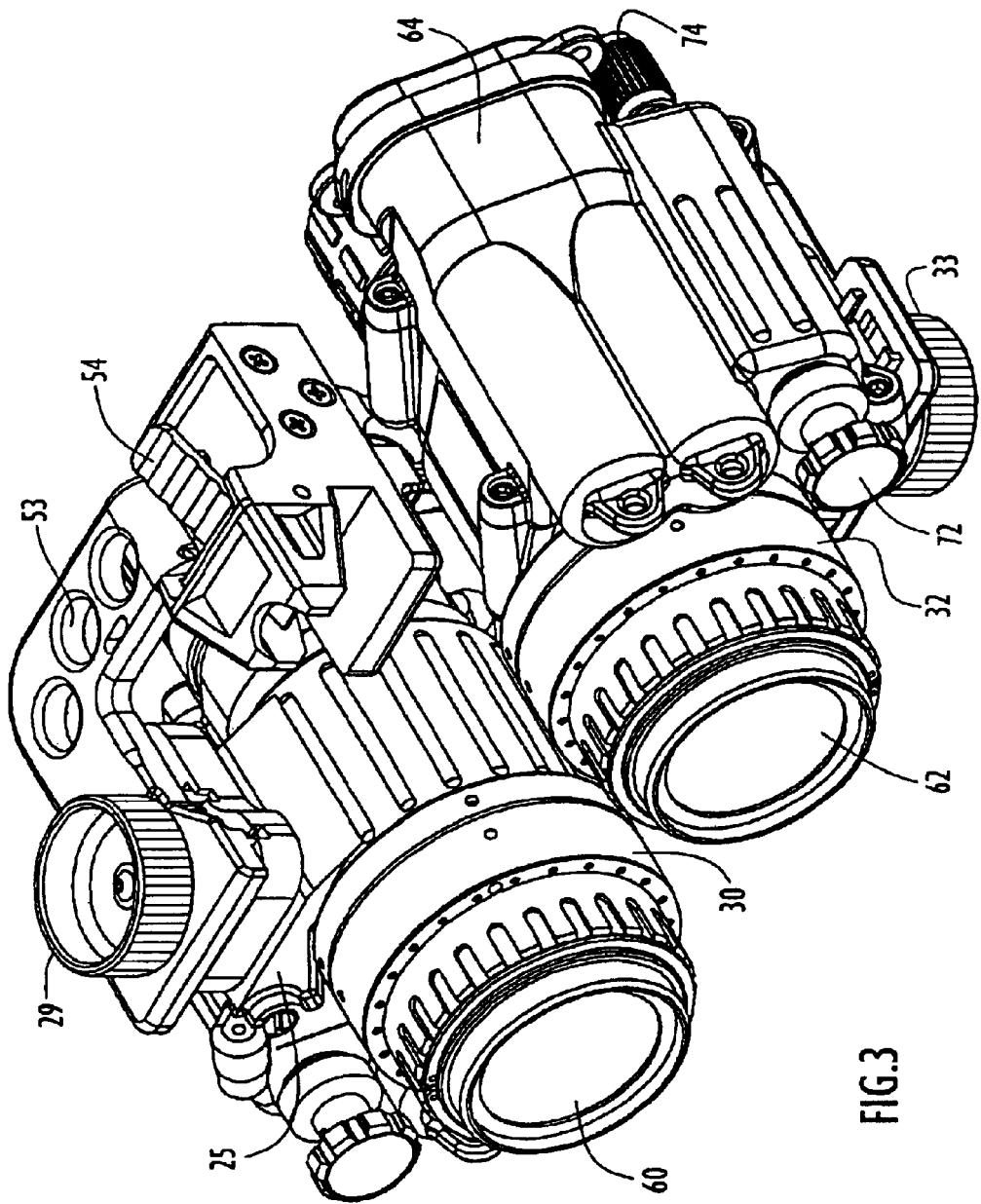
FIG. 3 shows the device from the opposite end as FIG. 2.
Figure 4:
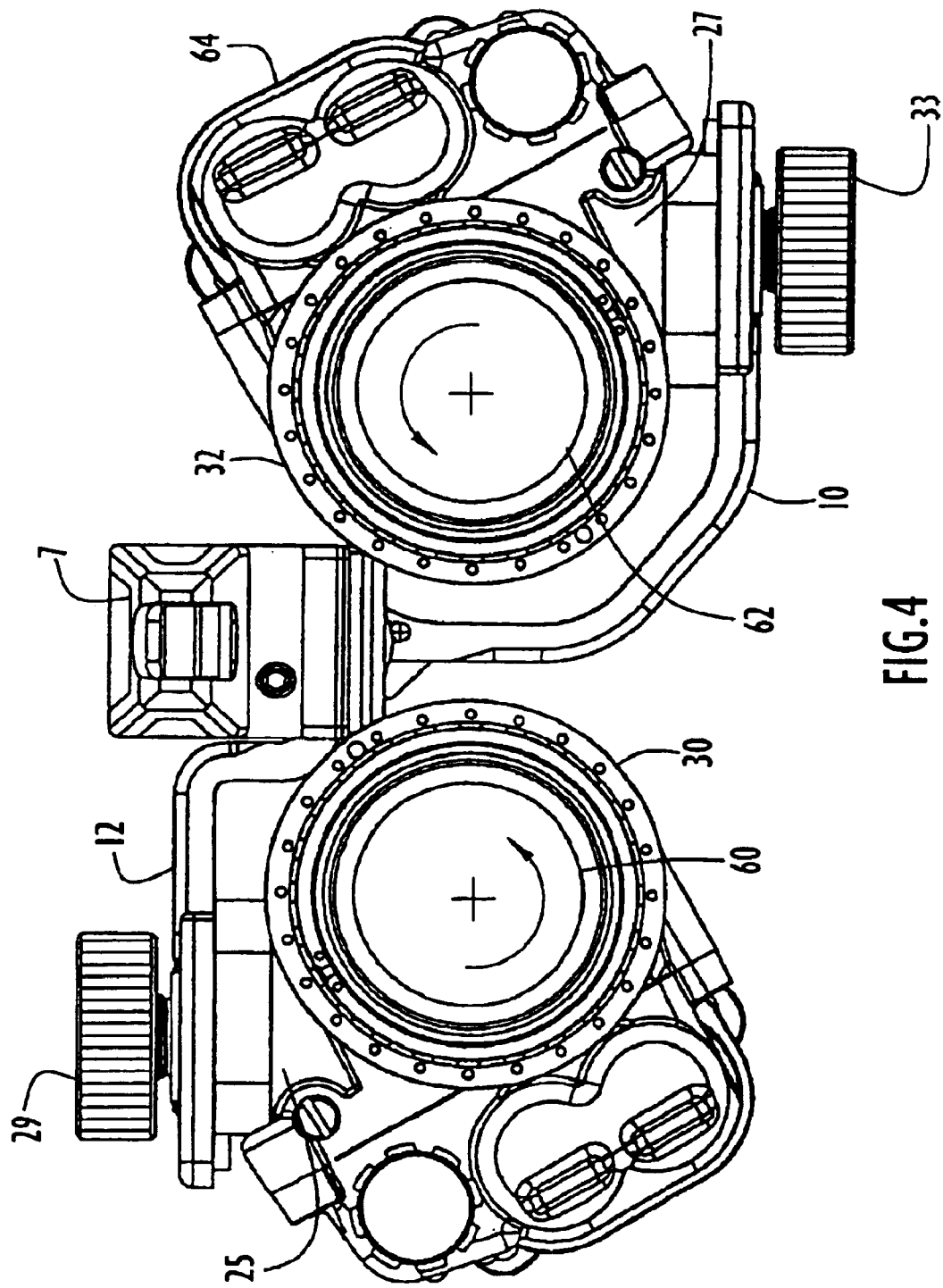
FIG. 4 shows how the monocular devices are collimated.

Referring to FIGS. 2 to 4, the monoculars 30 and 32 are attached to the mounting assembly by positioning them so that the threaded openings in mounting projections 25 and 27 are aligned with the mounting screws 18 and 20, and turning the control knobs 33 and 29 to tighten the screws. Referring again to FIG. 1, each mounting block has a ridge 44 which is inserted in a corresponding recess in mounting projections 25 and 27 to align the monoculars parallel to each other and prevent rotation during installation and operation. The device is also provided with electrical connectors such as shown at reference numerals 34 and 36 for facilitating electrical connection between the monoculars and the central assembly. Also, the mounting projections 25 and 27 may have mechanical features which interface with a bracket when the monocular is used as a monocular device.

The arms 10 and 12 are bent and dimensioned such that mounting regions 6 and 8 are equidistant from the central point of central assembly 7 in two mutually perpendicular directions, that is from left to right in FIG. 1 (laterally) and from front to back. The arms are L-shaped, with the first portion of the L-shape extending in the left-right direction in FIG. 1 and the second portion extending in the front-back direction. As seen in FIG. 1, the mounting regions are also separated from each other in elevation with respect to the central point.

Thus, in the operation of the device, monoculars are spaced at a desired nominal distance from each other (the distance between the mounting regions or the distance in between the mounting blocks when in a central position on the rails). To adjust the actual interpupillary distance in order to accommodate different users, the control knobs may be independently loosened and a monocular device or devices, moved, causing the mounting blocks to slide on the rails to allow adjustment. It is noted that movement of the monoculars is along a straight line path. When the correct adjustment is achieved, the control knobs are tightened, thus causing the screws to tighten in the monocular device mounting projections, and causing the mounting block to be compressed against the mounting projection and the arm to be compressed against the mounting block, to prevent further movement. In an actual device which was built, slot 31 and the corresponding slot on the other arm each allowed 10 mm of lateral adjustment, for a total of 20 mm. The resulting 52 to 72 mm interpupillary adjustment is sufficient for 99% of anthropomorphic variations in interpupillary spacing of the adult population. When the need for a binocular device is finished, the monocular devices may be removed from the mounting assembly by using the control knobs 33 and 29 to remove the screws from the mounting projections 25 and 27. Thus, the monoculars are restored to their original status as monocular devices, and may be so used.

As mentioned above, central assembly 7 is located between the arms for interfacing with a helmet or headband. This may be the same assembly that is used for interfacing a monocular device with a helmet or headband, so does not require any special adaptation. The mechanical means may be in the nature of a clamp in cavity 52 into which a projection of the helmet or headband is snapped. The clamp may be released by depressing lever 54. Arms 10 and 12 are typically made of metal, and may have openings 53 to make the device lighter.

The fasteners are permanently affixed to the arms, otherwise they would get lost While an embodiment where the mounting screws and mounting blocks are removable is not recommended, if built such apparatus would be encompassed herein. While the invention is particularly applicable to the widely fielded AN/PVS-14 night vision monocular shown in the Figures herein, other monoculars are encompassed as well.

FIG. 2 is a view of the device from the objective lens end, while FIG. 3 is a view of the device from the eyepiece end. Lenses 60 and 62 are parts of the eyepiece assemblies through which a user would look to see the light amplified image. In FIGS. 2 and 3 battery packs 64 and 66 are shown as are on/off switch 72 and gain control 74. All of such features are included in the monocular devices.

Electrical connections between the central assembly and the monoculars may be provided by means of contacts at the fasteners previously described and wiring guided by wire guides 56 which may lead to a magnetic switch in the central assembly. This is for enabling the shut-off on flip-up and shut-off on removal from the mount that are standard requirements for the previously mentioned AN/PVS-14. These requirements are for the image intensifier tubes to become inoperative when the helmet mount is moved to the flip-up position and when the device is removed from either the headband or helmet mount.

FIG. 4 shows the binocular device as viewed by a user, and it should be noted that the left and right monoculars are 180° rotated with respect to each other. In addition to providing optimal access to controls for the specific device shown, this arrangement is key to the ability to collimate the device.

The following is background information relating to the collimation method of the present invention. Night vision monocular devices such as the AN/PVS-14 use eyepieces which are similar to those used on existing night vision binocular sets (e.g., the AN/AVS-9(V). If the binocular set had no means of adjustment, optical and mechanical manufacturing tolerances would affect the optical and mechanical alignment of both optical channels and the images presented to each eye would not necessarily coincide in azimuth and elevation. If the images presented to each eye did not coincide it would be difficult to achieve binocular fusion on the object, creating the difficulties described above. Binocular fusion of both images is assured in the AN/AVS-9(V) by means essentially similar to that used in conventional daytime binoculars. With daytime binoculars an eccentric ring holds the first lens element in the objective of one of the channels. By rotating the eccentric ring, the image of an object in the center of the field of view of the eyepiece can be adjusted to be at the same azimuth and elevation as the image seen through the other eyepiece. This process is known as image collimation. In the event that exact collimation is not possible, the images are set up to converge. Convergent images are a feature of normal unaided human vision of close objects with, the left eye looking slightly to the right and the right eye looking slightly to the left. Convergent images do not adversely affect binocular fusion, because human beings do it all the time. Divergent images, where the eyes have to look outward, are detrimental to binocular fusion, as are dipvergent images where one image is seen above the other.

AN/AVS-9(V) collimation is achieved by rotating the eyepieces. The lenses in the eyepiece are held in a metal cell, contained by a plastic surround that interfaces with the remainder of the optical channel. The mechanical axes of the metal cell and the plastic surround are deliberately offset by a small amount. Thus, when the eyepiece is rotated, the mechanical axis of the metal cell describes a circle with respect to the mechanical axis of the plastic surround. As the eyepiece is rotated, the optical axis of the lenses also describes a circle with respect to the optical axis of the monocular channel. By using optical test equipment, it is possible to rotate each eyepiece to bring into collimation the images of an object seen through each optical channel. As with daytime binoculars, if exact collimation cannot be achieved, the procedure is to ensure that convergent images result.

Binocular sets such as the AN/AVS-9(V) are manufactured, operated and maintained as a binocular. The two optical channels are always associated with each other, hence collimation is not a problem. On the other hand when a device is manufactured, operated and maintained as a monocular if two such devices are combined to form a binocular, it is statistically improbable that they would be acceptably collimated.

The present invention is directed to a procedure for rotating the eyepieces of monoculars to a predetermined orientation during manufacture and maintenance. This procedure offsets the image in azimuth and centers it in elevation with respect to a specific orientation of the monocular. All monoculars undergo the same set-up procedure. Then, due to the configuration of the mounting assembly, when the monoculars are mounted therein the relative orientation of the monoculars is displaced by 180°. Thus, in the right hand monocular of FIG. 4, the eyepiece is rotated such that an image of an object in the center of the field of view is adjusted to be slightly left in azimuth, and centered in elevation. The arc and cross shown in the center of each eyepiece illustrates the principle. The cross represents the mechanical axis and the arrowhead represents the optical axis. The left monocular in FIG. 4 is 180° rotated from the right monocular. It's optical axis is offset slightly right in azimuth and centered in elevation. As a consequence, the binoculars formed by the two monoculars present a convergent image to both eyes.

In accordance with a specific set-up procedure, each monocular is placed on a table with the flat surface of mounting projection 27 being horizontal, flush with the table, in the position depicted in FIG. 4. The locking ring which holds the eyepiece in place is loosened, and with the use of optical test equipment, the entire eyepiece is rotated until an object in the center of the field of view appears to be slightly left in azimuth and centered in elevation. All monoculars are similarly adjusted.

The result of the procedure is that any monocular combined at random with any other monocular would create a collimated, convergent-image binocular that allows binocular fusion of the images seen by each eye. The apparatus of the invention is arranged so that when the eyepieces of two monocular devices are similarly adjusted, the devices will automatically mount with a relative rotative orientation displaced by 180°. This is constrained by the structure of the mounting assembly wherein the surfaces of respective movable blocks which interact with the mounting areas of the monocular devices face each other, as depicted in FIG. 4. It should be noted that indicia 80 on the eyepiece is for the purpose of focussing, not collimation. Thus, the rotative position of the eyepieces used to effect collimation is not seen in FIG. 4.

There thus has been described a method and apparatus for forming a binocular device from monoculars. It should be understood that while the invention has been disclosed in connection with preferred embodiments, variations will occur to those skilled in the art and are intended to be within the scope of the invention. Thus, the invention to be covered is defined in the following claims.

We claim:

1. A method of collimating first and second monocular devices for use in a binocular device, comprising the steps of:

rotating the eyepieces of both monocular devices by the same predetermined amount in the same direction with respect to a fixed reference point on the monocular device;

providing a mounting means having a right mounting position for a monocular device and a left mounting position for a monocular device opposite the right position;

securing the first monocular device to the mounting means at either the right mounting position or the left mounting position in such rotative orientation that if in the right position an object in the center of field of view of the monocular device is located slightly left in azimuth and centered in elevation, and if in the left position an object in the center of field of view is located slightly right in azimuth and centered in elevation; and securing the second monocular device in the mounting means in the opposite position from the first monocular device in a rotative orientation 180° displaced from the rotative orientation of the first monocular device.

2. The method of claim 1 wherein each of the first and second monocular devices have offset optical and mechanical axes.

3. The method of claim 2 wherein the step of rotating the eyepieces comprises slightly offsetting an image in azimuth and centering it in elevation with respect to a fixed orientation of the monocular.

4. The method of claim 3 wherein the monocular devices have mounting projection including a flat surface, wherein the step of rotating the eyepieces comprises rotating the eyepieces with the flat surface in a horizontal position facing downwardly, and wherein the image in azimuth is offset to be slightly left of center.

5. The method of claim 3 wherein the mounting means is structured so that when identical monocular devices are mounted in the right and left mounting positions respectively, they are constrained to be in rotative orientations which are displaced by 180° from each other.

6. The method of claim 5 wherein the monocular devices have mounting areas and wherein the mounting means comprises a pair of arms having respective mounting blocks for interfacing with respective mounting areas of the monocular devices, and the arms are bent such that the respective mounting blocks face each other to thereby determine relative rotative orientation of the monocular devices.

* * * * *